US011911338B1

(12) United States Patent
William Wallace

(10) Patent No.: US 11,911,338 B1
(45) Date of Patent: Feb. 27, 2024

(54) WALLET AND PURSE MEDICATION CARD

(71) Applicant: Matthew William Wallace, El Paso, TX (US)

(72) Inventor: Matthew William Wallace, El Paso, TX (US)

( * ) Notice: Subject to any disclaimer, the term of this patent is extended or adjusted under 35 U.S.C. 154(b) by 0 days.

(21) Appl. No.: 17/821,181

(22) Filed: Aug. 21, 2022

(51) Int. Cl.
*A61J 1/03* (2023.01)

(52) U.S. Cl.
CPC .................................... *A61J 1/035* (2013.01)

(58) Field of Classification Search
CPC ........... A61J 1/035; A61J 1/03; B65D 75/327; B65D 75/367; B65D 75/323
USPC ................................ 206/531, 528, 538, 534
See application file for complete search history.

(56) References Cited

U.S. PATENT DOCUMENTS 4,889,236 A * 12/1989 Bartell ................. B65D 75/327 206/534
5,791,478 A * 8/1998 Kalvelage ............ B65D 75/327 206/539
7,093,716 B2 * 8/2006 Intini ................... B65D 75/367 206/532
8,905,237 B2 * 12/2014 Leon Alonso ....... B65D 75/327 206/532
2005/0056564 A1 3/2005 Higgins
2013/0008825 A1 * 1/2013 McArthur ............... B65B 61/18 53/462
2015/0096920 A1 * 4/2015 Trombley ............... A61J 1/035 206/531
2015/0321028 A1 * 11/2015 Bennett .................. B65D 77/04 424/401

* cited by examiner

*Primary Examiner* — Steven A. Reynolds

(74) *Attorney, Agent, or Firm* — INNOVATION CAPITAL LAW GROUP, LLP; Vic Lin

(57) ABSTRACT

A personal Wallet and Purse Medication Card apparatus, which is, at most, the dimensions of a credit card, with a front surface and a back surface opposite the front surface. The card has at least one sealed cavity designed for securely housing generic, as-needed medication that does not more than marginally protrude beyond the front surface, is generally the dimensions of a credit card, and intended to fit within modern-day clothing, a personal wallet, or purse.

11 Claims, 2 Drawing Sheets

WALLET AND PURSE MEDICATION CARD

CROSS REFERENCE TO RELATED APPLICATIONS

This application claims the benefit of U.S. Provisional Patent Application No. 61/945,563 filed Feb. 27, 2014.

This application is from the same applicant and inventor of U.S. patent application Ser. No. 14/631,836 filed Feb. 25, 2015.

FIELD OF THE INVENTION

The present invention relates generally to a method for transporting items on an individual's person; and in particular to the Wallet and Purse Medication Card, an item the same general dimensions as a credit card, which is easily stored by an individual for transportation in a credit card slot of modern-day clothing, a personal wallet, or purse.

BACKGROUND OF THE INVENTION

Occasionally people are required to take generic medications on an as-needed basis in order to ameliorate potentially detrimental health conditions. For example, ingesting ibuprofen at the onset of pain could help alleviate building discomfort. Similarly, taking an antihistamine could allow for an individual to reduce the effects of an allergen and complete their day without returning home earlier than expected.

Unfortunately, modern-day clothing, personal wallet, and purse design does not always allow for the convenient transportation of generic, as-needed medications.

Devices that can be used to retain as-needed medication doses for convenience have long been used, the simple pillbox being one common example—comparable to the modern-day pill bottle. Another common method of retaining medication in pre-determined dosages is the well-known "blister packaging" which is generally used for medication in pill form. However, neither of these products are designed, nor intended, to be easily and discreetly carried within modern-day clothing, a personal wallet, or purse.

This application embodies a solution to issue-at-hand: a convenient, easily transportable, as-needed, generic medication-dispensing apparatus, which safely retains medication in blisters and is generally the dimensions of a credit card, with a front surface of about 85 mm by about 54 mm, and less than 90 mm by 60 mm, wherein the blisters do not more than marginally protrude beyond the front surface, enabling the user to keep their generic medication in a discreet, convenient location, such as a credit card slot within modern-day clothing, a personal wallet, or purse.

Blister packaging has previously been used to retain medications in various sized medication retaining devices, including a credit card-sized device. For example, U.S. Pat. No. 4,889,236 discloses a "credit card-style medication package" that contains blister pack housed medications located beyond the front surface of the device. However, this design can make the device difficult to fit into the credit card slot of a personal wallet or purse due to the extreme protrusion of the blisters extending substantially beyond the front surface of the device within the credit card slot. Additionally, this "credit card-style medication package" focuses on use within the imprinted calendar-day schedule—and not on an as-needed basis. The Abstract for the "credit card-style medication package" states the medications "must be taken on a calendar day schedule" which differentiates that product from the Wallet and Purse Medication Card.

Similarly, in another example, U.S. Pat. App. No. US2005/0056564 discloses a "wallet pill card" that has a plurality of blister pack-housed medications located on the top portion of one face of the device as well as writing on the device, such as an advertisement or instructions on how to ingest the medication. However, the clearly visible medication of the "wallet pill card", when inserted into a wallet as taught, may lead to inadvertent medication release due to the extremely protruded nature of the blister packaging beyond the front surface of the card. Additionally, the requirement that the medication only be on the top portion of the device limits the number of blister-pack housed doses that can be present within the card which differentiates that product from the Wallet and Purse Medication Card.

Therefore, a need exists for a convenient, easily transportable, as-needed, generic medication-dispensing apparatus, which safely retains medication in blisters and is generally the dimensions of a credit card, with a front surface of about 85 mm by about 54 mm, and less than 90 mm by 60 mm, wherein the blisters do not more than marginally protrude beyond the front surface, enabling the user to keep their generic medication in a discreet, convenient location, such as a credit card slot within modern-day clothing, a personal wallet, or purse.

SUMMARY OF THE INVENTION

It is an object of the present invention to overcome the limitations of the credit card slot inherent in the personal medication dispensing devices listed above.

It is therefore an object of the present invention to provide a convenient, easily transportable, as-needed, generic medication-dispensing apparatus, which safely retains medication in blisters and is generally the dimensions of a credit card, with a front surface of about 85 mm by about 54 mm, and less than 90 mm by 60 mm, wherein the blisters do not more than marginally protrude beyond the front surface, enabling the user to keep their generic medication in a discreet, convenient location, such as a credit card slot within modern-day clothing, a personal wallet, or purse.

The present invention relates to a personal Wallet and Purse Medication Card apparatus with a front surface and a back surface opposite the front surface. The card has at least one sealed cavity (a "blister") designed for securely housing as-needed, generic medication that does not more than marginally protrude beyond the front surface, is generally the dimensions of a credit card, and intended to fit within modern-day clothing, a personal wallet, or purse.

The present invention front surface and bottom surface are at most the dimensions of a credit card with a front surface and bottom surface of less than 90 mm by 60 mm. A middle portion, containing a at least one sealed cavity, and affixed between the front and back surface, designed for securely housing medication and facing outward through the front surface of the card, as is commonly known in the industry as "blister packaging." A bottom rupture portion, affixed to the middle portion or bottom surface, seals and safely retains the medication until the individual is ready to dispense the dose.

As is well known in the art, the depth of a credit card is generally less than 1 mm; but, in the present invention, the depth of the apparatus can vary depending on the dimensions of the medication housed within.

The blister packed housed medication is designed to release the medication when pressure is applied to the blister thereby forcing the medication through the bottom rupture portion of the apparatus.

The personal Wallet and Purse Medication Card apparatus has writing on at least one surface of the card. In another embodiment, the personal Wallet and Purse Medication Card apparatus has a scannable code, on at least one surface of the card, such as a UPC scannable code.

DETAILED DESCRIPTION OF PREFERRED EMBODIMENTS OF THE INVENTION

Figure 1:
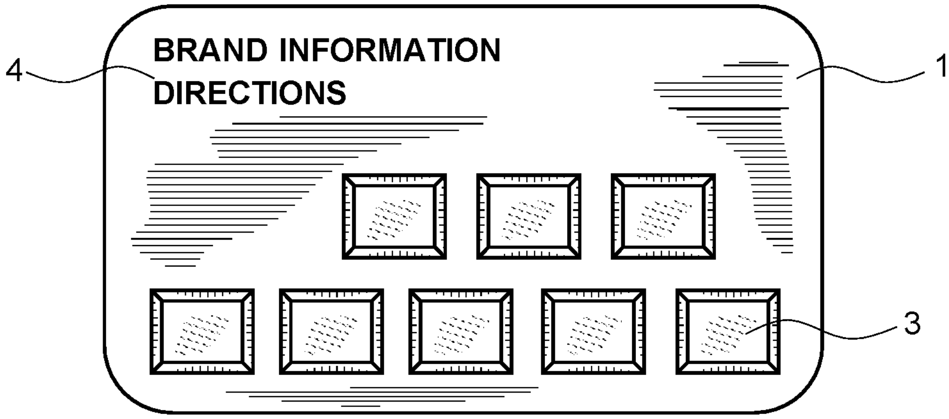
FIG. 1 is a front surface (1) view of the Wallet and Purse Medication Card apparatus with visible blister pack housed medication cavities (3) and writing on the device (4).

The present invention relates to a convenient, easily transportable, as-needed, generic medication-dispensing apparatus, which safely retains medication in blisters and is generally the dimensions of a credit card, with a front surface of about 85 mm by about 54 mm, and less than 90 mm by 60 mm, wherein the blisters do not more than marginally protrude beyond the front surface, enabling the user to keep their generic medication in a discreet, convenient location, such as a credit card slot within modern-day clothing, a personal wallet, or purse.

The following text sets forth a broad description of a plurality of different embodiments of the present invention. The description is to be construed as exemplary only and does not describe every possible embodiment since describing every possible embodiment would be impractical, if not impossible, and it well be understood that any feature, characteristic, component, composition, ingredient, product, step or methodology described herein can be deleted, combined with or substituted for, in whole or in part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents herein are incorporated by reference.

It should also be understood that, unless a term is expressly defined in this specification using the sentence "As used herein, the term '______' is hereby defined to mean . . . " or similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for the sake of clarity only to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112.

The term "blister" refers to an enclosure formed by an outer covering that is raised at the face (otherwise referred to as the "front surface") thereby forming a cavity for housing a medication unit dose. The blister is a sealed cavity with an opposing rupture portion which is used to retain a medication until sufficient pressure is applied to the blister, forcing the medication to break through the backing and thereby releasing the medication from the sealed cavity.

The blisters can be made from a variety of materials, including without limitation polyvinyl chloride, thermoplastic materials, polyolefins, glycol-modified polyethylene terephthalate and combinations thereof. The layer of the rupture portion of the blister can also be made from a variety of materials, including without limitation metal foil, tempered metal foil, paperboard, polyvinyl chloride, polyester, polyolefins, polystyrenes, polyesters, fluoropolymer resins, and combinations thereof.

The Wallet and Purse Medication Card apparatus material can be made of a variety of materials, including without limitation polyvinyl chloride, paper, plastic, and combinations thereof.

The term "UPC" refers to the Universal Product Code, a barcode consisting of an array of black and white lines of varying widths that symbolize numerical digits and can be scanned to read the information contained therein. The UPC code is designed to be scanned by a narrow beam of light.

Referring to FIG. 1, A Wallet and Purse Medication Card apparatus is illustrated with a front surface (1), having at least one sealed cavity not protruding more than marginally beyond the front surface, designed for housing medication and facing through and out said front surface (3), and with writing (4) on at least one surface of the card. The writing can include alphanumeric characters, pictures, drawings, illustrations, photographs, computer-produced images, colors, textures, shapes, symbols, letters, numbers, and combinations thereof. The size of the front surface of the Wallet and Purse Medication Card apparatus is no larger than a credit card with the dimensions of less than 90 mm by 60 mm, with the depth of the Wallet and Purse Medication Card apparatus variable depending upon the depth of the medication housed in the sealed cavity or cavities (blister or blisters), if more than one cavity is contained within the middle portion of the card.

Figure 2:
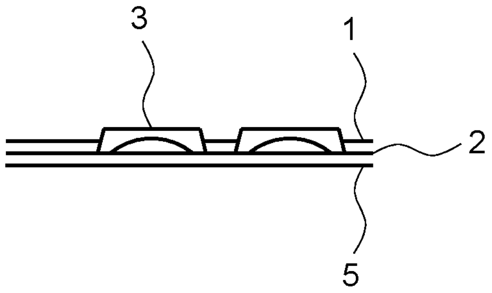
FIG. 2 is a three-layered side view (1, 2, 5) of the Wallet and Purse Medication Card apparatus with visible blister pack medication cavities within the device (2, 3). It is to be especially noted that, unlike the previously discussed patents and patent applications, the blisters, do not more than marginally protrude beyond the front surface of the card.

Referring to FIG. 2, A Wallet and Purse Medication Card apparatus is illustrated from the side with a front surface (1), a bottom surface opposite the front surface (5), and a middle portion (2) in-between, said middle portion having at least one sealed blister cavity (3) attached to it and designed to house medication. The depth of the blisters housing the medication is illustrated here from this view of the Wallet and Purse Medication Card apparatus; it is clear that the protrusion is not intended to be more than marginally beyond the front surface.

Figure 3:
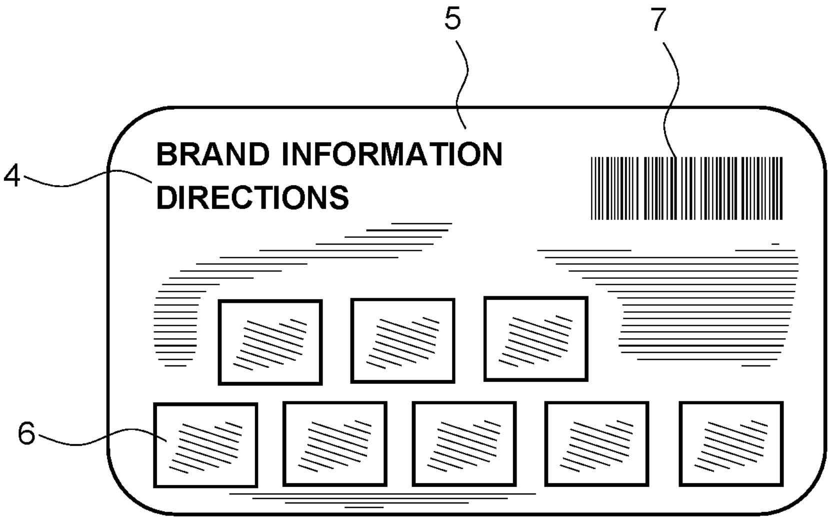
FIG. 3 is a back surface view (5) of the Wallet and Purse Medication Card apparatus with the rupture portion located over the bottom of the blister pack housed medication cavities (6) and writing on the device (4), with an optional UPC scannable code (7).

Referring to FIG. 3, A Wallet and Purse Medication Card apparatus is illustrated with a bottom surface (5), with a rupture portion located over the bottom of the blister pack sealed cavities (6), with writing (4) on at least one surface of the card, and said card having a scannable UPC code (7), a barcode consisting of an array of black and white lines of varying widths that symbolize numerical digits and can be scanned to read the information contained therein.

Figure 4:
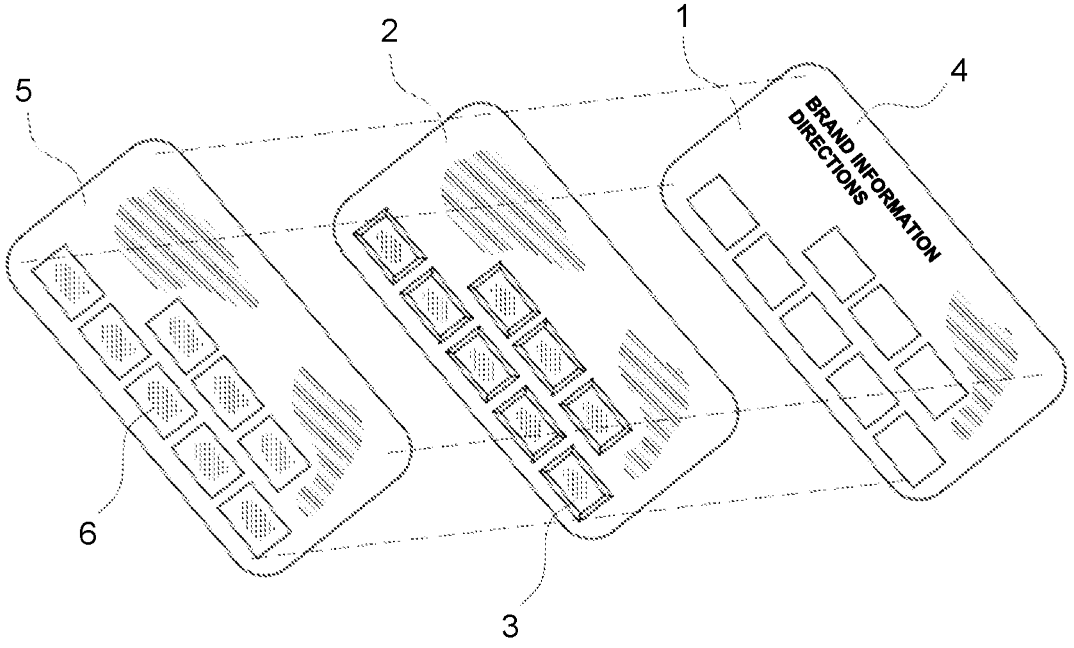
FIG. 4 is an exploded view of the Wallet and Purse Medication Card apparatus which displays the front surface (1), with writing on the device (4), middle portion (2), with the visible blister pack housed medication cavities (3), and bottom surface (5), visible with rupture portion attached (6), in line with one another to show the interaction between the layers of the device.

Referring to FIG. 4, A Wallet and Purse Medication Card apparatus is illustrated in exploded form with a front surface (1), a middle portion (2), with a least one sealed cavity designed for housing medication and facing through and out said front surface (3), with a bottom surface (5), said bottom surface having a rupture portion over the bottom of the blister pack sealed cavities (6), with writing (4) on at least one surface of the card.

Although the present invention has been described in considerable detail with reference to certain preferred embodiments thereof, other embodiments or versions will become apparent to those of ordinary skill in the art. Additionally, variations of additional Wallet and Purse Medication Cards are possible. Therefore, the spirit and scope of the appended claims and the concepts taught therein should not be limited to the description of the preferred embodiments contained herein.

What is claimed is:

1. A medication-dispensing apparatus, comprising:

a front portion having:

a thickness of between about 0.51 mm and 1.02 mm;

peripheral dimensions of about 85 mm to less than 90 mm by about 54 mm to less than 60 mm;

at least one aperture wherein a middle portion, comprising at least one cavity, is operable to protrude through respective ones of the at least one aperture and out a front surface of the front portion; and the at least one aperture is configured to surround a shape of medication disposed within the at least one cavity of the middle portion;

the middle portion having:

a thickness of between about 0.127 mm and 0.381 mm;

substantially the same peripheral dimensions of said front portion;

the at least one cavity is used to retain the medication until sufficient pressure is applied to the at least one cavity, forcing the medication to break through a rupture portion backing, sealing a back side of the at least one cavity, and thereby releasing the medication from the cavity;

the at least one cavity does not more than marginally protrude beyond the front surface; and a middle portion front surface of said middle portion being firmly sealed to a bottom side of said front portion;

a bottom portion formed from a material selected from polyvinyl chloride, paper, plastic, or a combination thereof, having:

a thickness of between about 0.51 mm and 1.02 mm;

substantially the same peripheral dimensions of said front portion;

at least one bottom portion aperture aligning in size and outer shape with the at least one aperture in the front portion;

the rupture portion backing disposed to close the at least one bottom portion aperture; and a bottom portion front surface of the bottom portion sealed together with a middle portion bottom surface of said middle portion; and the rupture portion backing comprising one of metal foil, tempered metal foil, paperboard, polyvinyl chloride, polyester, polyolefins, polystyrenes, polyesters, fluoropolymer resins, or a combination thereof, having:

a thickness of between about 0.127 mm and 0.381 mm; and the rupture portion backing is located over the bottom of each of the at least one cavity to retain the medication until sufficient pressure is applied to one of the at least one cavity, forcing the medication to break through the rupture portion backing and thereby releasing the medication from one of the at least one cavity, wherein the rupture portion backing is visible from a back side of the medication-dispensing apparatus through the at least one bottom portion aperture prior to taking any steps of dispensing the medication from the medication-dispensing apparatus.

2. The medication-dispensing apparatus of claim 1, wherein the front portion include writing, including one or more of alphanumeric characters, pictures, drawings, illustrations, photographs, computer-produced images, colors, textures, shapes, symbols, letters, numbers, or combinations thereof.

3. The medication-dispensing apparatus of claim 1, wherein the front surface is formed from polyvinyl chloride, paper, plastic, or combinations thereof.

4. The medication-dispensing apparatus of claim 1, wherein the at least one aperture is formed in a rectangular or elliptical shape.

5. The medication-dispensing apparatus of claim 1, wherein the middle portion is formed from polyvinyl chloride, thermoplastic materials, polyolefins, glycol-modified polyethylene terephthalate or combinations thereof.

6. The medication-dispensing apparatus of claim 1, wherein the bottom portion has writing, including one or more of alphanumeric characters, pictures, drawings, illustrations, photographs, computer-produced images, colors, textures, shapes, symbols, letters, numbers, or combinations thereof.

7. A medication-dispensing apparatus comprising:

a front portion having one or more apertures formed therethrough, each of the at least one apertures sized to fit a medication therein;

a middle portion having a base portion with one or more cavities formed therein, the middle portion positioned at a rear side of the front portion, the one or more cavities having a top surface accessible from within the at least one aperture of the front portion, the one or more cavities having side members extending from an outer periphery of the top surface to the base portion, wherein the top portion and the side members define each of the one or more cavities;

a bottom portion having one or more bottom apertures aligning in size and outer shape with the one or more apertures of the front portion; and a rupture material closing the one or more bottom apertures, wherein pressing on the top surface of the one or more cavities forces a medication disposed within the one or more cavities to rupture the rupture material to remove the medication from the medication-dispensing apparatus, wherein the rupture material is visible from a back side of the medication-dispensing apparatus through the at least one bottom portion aperture prior to taking any steps of dispensing the medication from the medication-dispensing apparatus.

8. The medication-dispensing apparatus of claim 7, wherein the bottom portion is formed from polyvinyl chloride, paper, plastic, or a combination thereof.

9. The medication-dispensing apparatus of claim 8, wherein the bottom portion has a thickness of between about 0.51 mm and 1.02 mm.

10. The medication-dispensing apparatus of claim 8, wherein the rupture material is formed from metal foil, tempered metal foil, paperboard, polyvinyl chloride, polyester, polyolefins, polystyrenes, polyesters, fluoropolymer resins, or a combination thereof.

11. The medication-dispensing apparatus of claim 10, wherein the rupture material has a thickness of between about 0.127 mm and 0.381 mm.

* * * * *